(12) United States Patent
Suess et al.

(10) Patent No.: US 9,827,736 B2
(45) Date of Patent: Nov. 28, 2017

(54) COVER PANEL FOR AT LEAST ONE DISPLAY INSTRUMENT IN A VEHICLE

(71) Applicant: JOHNSON CONTROLS AUTOMOTIVE ELECTRONICS GMBH, Remchingen (DE)

(72) Inventors: Manfred Suess, Remchingen (DE); Martin Mayer, Sinsheim (DE); Michael Hertweck, Karlsruhe (DE); Eckard Unseld, Stuttgart (DE); Philip Rudnick, Walzbachtal (DE); Wolfgang Tausch, Waldbronn (DE)

(*) Notice: Subject to any disclaimer, the term of this patent is extended or adjusted under 35 U.S.C. 154(b) by 137 days.

(21) Appl. No.: 14/611,881

(22) Filed: Feb. 2, 2015

(65) Prior Publication Data
US 2015/0217531 A1 Aug. 6, 2015

(30) Foreign Application Priority Data
Feb. 3, 2014 (DE) .................. 10 2014 201 885

(51) Int. Cl.
*B32B 3/10* (2006.01)
*B32B 3/30* (2006.01)
(Continued)

(52) U.S. Cl.
CPC .......... *B32B 3/266* (2013.01); *B29C 45/0055* (2013.01); *B29C 45/2673* (2013.01);
(Continued)

(58) Field of Classification Search
None
See application file for complete search history.

(56) References Cited

U.S. PATENT DOCUMENTS 2,238,446 A * 4/1941 Kuettel .................. C08J 7/08
264/108
4,567,082 A * 1/1986 Tabata .................. B60K 37/00
428/138
(Continued)

FOREIGN PATENT DOCUMENTS

DE 2613024 A1 * 9/1977
DE 2729078 A * 1/1979
(Continued)

OTHER PUBLICATIONS

Machine Translation of DE 10153100 A1, May 2003.*
(Continued)

*Primary Examiner* — Jeff Vonch
(74) *Attorney, Agent, or Firm* — Foley & Lardner LLP

(57) ABSTRACT

A cover panel, for at least partially transparently covering at least one display instrument in a vehicle, has a microstructure applied on at least one surface. The microstructure is suitable for scattering visible light which is incident on the cover panel. The at least one window region of the cover panel is cutout from the microstructure. A method for manufacturing such a cover panel uses a molding tool with an applied microstructure matrix for forming a microstructure on a part of the molding tool which is assigned to a surface of a molded cover panel. The parts of the molding tool which are assigned to window regions are cut out from the microstructure matrix.

4 Claims, 2 Drawing Sheets

(51) Int. Cl.

| | | |
|---|---|---|
| B32B 5/14 | (2006.01) | |
| B32B 7/02 | (2006.01) | |
| B32B 27/30 | (2006.01) | |
| B60K 35/00 | (2006.01) | |
| G01D 11/26 | (2006.01) | |
| G02B 5/02 | (2006.01) | |
| B29C 45/00 | (2006.01) | |
| B60K 37/00 | (2006.01) | |
| B60K 37/02 | (2006.01) | |
| B32B 3/26 | (2006.01) | |
| B32B 7/00 | (2006.01) | |
| B29C 45/26 | (2006.01) | |
| B29C 45/37 | (2006.01) | |

(52) U.S. Cl.
CPC ............ *B29C 45/372* (2013.01); *B32B 5/147* (2013.01); *B32B 7/00* (2013.01); *B32B 27/308* (2013.01); *B60K 35/00* (2013.01); *B60K 37/00* (2013.01); *B60K 37/02* (2013.01); *G02B 5/021* (2013.01); *B32B 3/26* (2013.01); *B32B 3/30* (2013.01); *B32B 5/142* (2013.01); *B32B 7/005* (2013.01); *B32B 7/02* (2013.01); *B32B 2307/408* (2013.01); *B32B 2307/4026* (2013.01); *B32B 2307/412* (2013.01); *B32B 2307/414* (2013.01); *B32B 2307/418* (2013.01); *B32B 2605/00* (2013.01); *B32B 2605/003* (2013.01); *B32B 2605/006* (2013.01); *B60K 2350/1064* (2013.01); *B60K 2350/2082* (2013.01); *B60K 2350/2086* (2013.01); *B60K 2350/2091* (2013.01); *G01D 11/26* (2013.01); *G02B 5/0221* (2013.01); *G02B 5/0278* (2013.01); *G02B 5/0294* (2013.01); *Y10T 428/23* (2015.01); *Y10T 428/239* (2015.01); *Y10T 428/2495* (2015.01); *Y10T 428/24331* (2015.01); *Y10T 428/24355* (2015.01); *Y10T 428/24479* (2015.01); *Y10T 428/24942* (2015.01)

(56) References Cited

U.S. PATENT DOCUMENTS

| | | | | |
|---|---|---|---|---|
| 4,756,603 A * | 7/1988 | Ohtani | ............ | G02B 5/045 359/454 |
| 5,695,854 A * | 12/1997 | Breen | ............ | B60K 37/02 382/214 |
| 5,741,058 A * | 4/1998 | Suzuki | ............ | B60K 35/00 362/23.01 |
| 5,956,107 A * | 9/1999 | Hashimoto | ............ | G01D 11/28 349/62 |
| 6,120,159 A * | 9/2000 | Inoguchi | ............ | B60K 37/02 362/23.01 |
| 6,359,735 B1 | 3/2002 | Gombert et al. | | |
| 6,765,546 B2 * | 7/2004 | Akamine | ............ | B60K 35/00 340/988 |
| 7,382,237 B2 * | 6/2008 | Stoschek | ............ | B60K 35/00 340/425.5 |
| 8,591,051 B2 * | 11/2013 | Nakajima | ............ | G09F 13/06 264/400 |
| 2001/0038493 A1 * | 11/2001 | Watanabe | ......... | B29C 45/14827 359/609 |
| 2002/0085366 A1 * | 7/2002 | Angell | ............ | B60K 37/02 362/23.13 |
| 2003/0048194 A1 * | 3/2003 | Wada | ............ | B60K 35/00 340/815.4 |
| 2003/0107550 A1 * | 6/2003 | Tuzar | ............ | B60K 35/00 345/156 |
| 2004/0005436 A1 * | 1/2004 | Mori | ............ | B29C 45/14811 428/141 |
| 2005/0278996 A1 * | 12/2005 | Vitale | ............ | B60K 37/02 40/427 |
| 2005/0281018 A1 | 12/2005 | Birman et al. | | |
| 2006/0062004 A1 | 3/2006 | Birman | | |
| 2006/0202617 A1 * | 9/2006 | Yamada | ............ | B60K 35/00 313/512 |
| 2008/0219018 A1 * | 9/2008 | Eich | ............ | B60K 37/02 362/489 |
| 2010/0000464 A1 * | 1/2010 | Adams | ............ | B60K 35/00 116/28 R |
| 2012/0033408 A1 * | 2/2012 | Nakajima | ............ | G09F 13/06 362/97.1 |
| 2012/0218493 A1 * | 8/2012 | Funada | ............ | B60K 35/00 349/58 |
| 2012/0255208 A1 * | 10/2012 | Demma | ............ | B60K 37/02 40/542 |
| 2012/0300304 A1 * | 11/2012 | Gollier | ............ | C03C 15/00 359/599 |
| 2013/0293445 A1 | 11/2013 | Sturmat et al. | | |
| 2014/0210605 A1 * | 7/2014 | Abel | ............ | B60K 37/02 340/441 |
| 2014/0327030 A1 * | 11/2014 | Benedict | ............ | H01L 33/0079 257/98 |
| 2014/0327536 A1 * | 11/2014 | Suss | ............ | B60K 37/02 340/461 |
| 2015/0191391 A1 * | 7/2015 | Sinapi | ............ | C03C 15/00 428/156 |
| 2016/0048050 A1 * | 2/2016 | Okada | ............ | G01D 11/28 349/58 |
| 2016/0083573 A1 * | 3/2016 | Berdin | ............ | C09K 3/16 252/511 |

FOREIGN PATENT DOCUMENTS

| | | | | |
|---|---|---|---|---|
| DE | 197 08 776 C1 | | 6/1998 | |
| DE | 19806146 A1 | * | 9/1999 | ............ B60K 35/00 |
| DE | 10024232 A1 | * | 11/2001 | ............ B60K 35/00 |
| DE | 101 20 463 A1 | | 10/2002 | |
| DE | 10116205 A1 | * | 10/2002 | ............ B60K 37/02 |
| DE | 10153100 A1 | * | 5/2003 | ............ G01D 11/28 |
| DE | 101 60 749 A1 | | 6/2003 | |
| DE | 696 27 088 T2 | | 3/2004 | |
| DE | 1120050 01 850 T5 | | 8/2007 | |
| DE | 102006 29 219 A1 | | 12/2007 | |
| DE | 102006029219 A1 | * | 12/2007 | ............ B60K 37/02 |
| DE | 1120060 01 629 T5 | | 5/2008 | |
| DE | 102008052420 A1 | * | 4/2010 | ............ B60K 37/02 |
| DE | 102010 31 937 A1 | | 3/2011 | |
| DE | 102010 56 282 A1 | | 6/2012 | |
| DE | 102012005076 A1 | * | 9/2013 | ............ G12B 11/04 |
| EP | 78372 A2 | * | 5/1983 | |
| EP | 759372 A2 | * | 2/1997 | |
| EP | 890471 A2 | * | 1/1999 | |
| EP | 1 249 369 A1 | | 10/2002 | |
| EP | 1 365 262 A2 | | 11/2003 | |
| EP | 1873001 A1 | * | 1/2008 | ............ B60K 37/02 |
| EP | 2 664 477 A1 | | 11/2013 | |
| FR | 2842471 A1 | * | 1/2004 | ............ B60K 37/00 |
| JP | S57-019423 U | | 7/1955 | |
| JP | S54-166347 U | | 11/1979 | |
| JP | 56133701 A | * | 10/1981 | ............ G02B 5/045 |
| JP | S60-031618 U | | 3/1985 | |
| JP | 61078859 A | * | 4/1986 | |
| JP | 61112221 U | * | 7/1986 | |
| JP | 61172017 A | * | 8/1986 | |
| JP | 62195521 A | * | 8/1987 | |
| JP | H03-114014 U | | 11/1991 | |
| JP | H04-019474 Y | | 5/1992 | |
| JP | 06047822 U | * | 6/1994 | |
| JP | 07220514 A | * | 8/1995 | |
| JP | 0810775 Y2 | * | 3/1996 | |
| JP | 09-123181 A | | 5/1997 | |
| JP | H09-239739 A | | 9/1997 | |
| JP | 10120860 A | * | 5/1998 | |
| JP | 10-235655 A | | 9/1998 | |
| JP | 2003-001680 A | | 1/2003 | |
| JP | 2003254796 A | * | 9/2003 | |

(56) References Cited

FOREIGN PATENT DOCUMENTS

JP         2003294497 A   *   10/2003
JP         2008009432 A   *   1/2008             B60K 37/02
WO    WO-2007/002000 A1     1/2007

OTHER PUBLICATIONS

Machine Translation of JP 0810775 Y2, Mar. 1996.*
English Abstract for DE 2729078 A, Jan. 1979.*
Machine Translation of JP 57019423 U, Feb. 1982.*
Saitzyk, Excepts from Art Hardware: The Definitive Guide to Artists' Materials, 1987 (no month).*
English Abstract for JP 61078859 A, Apr. 1986.*
Office Action dated Mar. 8, 2016, in corresponding Japanese application No. 2015-018430 and English translation, 6 pages.
Office Action dated Jan. 23, 2015, in corresponding German Application No. 10 2014 201 885.4, 8 pages.
Office Action dated Aug. 28, 2016, received in corresponding Japanese application No. 2015-018430 and English translation, 5 pages.

* cited by examiner

COVER PANEL FOR AT LEAST ONE DISPLAY INSTRUMENT IN A VEHICLE

CROSS REFERENCE TO RELATED APPLICATIONS

The present application claims the benefit of German Patent Application No. 10 2014 201 885.4 filed on Feb. 3, 2014, the entire disclosure of which is incorporated herein by reference.

The invention relates to a cover panel for at least one display instrument in a vehicle.

Display instruments which are integratable in a vehicle cockpit and which permit a plurality of different control parameters and vehicle parameters to be displayed are known from the prior art. For example, by means of such known display instruments it is possible to display parameters such as velocity, rotational speed, instantaneous fuel consumption, daily kilometer reading and also warning messages such as excessively low oil pressure, excessively high coolant temperature or excessively low charge current of the generator. In addition it is possible to display informative messages, for example navigation messages or messages relating to a currently represented audio content. In addition, what are referred to as combination instruments are known which comprise a plurality of display instruments and therefore permit various control parameters and vehicle parameters to be read at one location.

Known display instruments and/or combination instruments are covered by means of transparent cover panels which close off the display instruments located behind them in essentially dust-tight fashion and protect them against soiling and mechanical damage, but at the same time permit unimpeded reading of the display instruments. Cover panels which are fabricated from polymethylmetaacrylate (PMMA) in an injection moulding method are known from the prior art.

In addition, methods for manufacturing a microstructured surface in which firstly in a moulding step components of a desired geometry are moulded and in a subsequent step the surface of a component which is moulded in this way is provided entirely or partially with a microstructure are known from the prior art. For example, etching methods for matting mineral glass surfaces are known from the prior art.

The object of the present invention is to specify an improved cover panel for at least one display instrument in a vehicle and a method for manufacturing an improved cover panel for at least one display instrument in a vehicle.

The object is achieved according to the invention with respect to the cover panel with a cover panel according to the features of Claim 1. With respect to the manufacturing method, the object is achieved according to the invention with a method according to the features of Claim 5.

Advantageous refinements of the invention are the subject matter of the dependent claims.

According to the invention, a cover panel for at least partially transparently covering at least one display instrument in a vehicle has a microstructure on at least one surface, wherein this microstructure is embodied in such a way that visible light which is incident on the cover panel is scattered. In this context, at least one window region of the cover panel is cut out from the microstructure.

The microstructure which is applied to the cover panel reduces undesired reflections which in the case of a smooth panel surface which is known from the prior art can lead to irritation or even dazzling of an observer, for example the driver, and at least make the readability of the display instruments arranged behind the cover panel more difficult. Such undesired reflections can be caused, for example, by direct solar radiation on the cover panel, by the headlights of other vehicles located behind the vehicle or else by radiation from artificial light sources of the interior lighting of the vehicle. By means of such a microstructure it is additionally also possible to reduce or avoid disruptive multiple images, referred to as ghost images, of display instruments located behind the cover panel in the viewing direction, even when there is a slight incline of the cover panel with respect to the viewing direction.

Since not only the reflected portion of light, but inevitably also the transmitted portion of light, at the surface of such a cover panel is reduced by the application of a microstructure, the display instruments behind a cover panel which is provided over its entire surface with a microstructure are perceived with reduced brightness, reduced contrast and reduced sharpness of contours. A cover panel according to the invention advantageously avoids this disadvantage in that the regions which are essential for the readability of the display instruments behind the cover panel are excluded from the microstructuring. Since these regions make up only a portion, typically approximately a third to approximately half, of the entire surface of the cover panel, the desired effect of the suppression of reflections is nevertheless essentially retained.

In one embodiment of the invention, the cover panel is essentially composed from PMMA. PMMA provides the advantage of a lightweight, thermoplastically shapeable and cost-effective plastic with optical properties similar to glass and a relatively high scratch resistance as well as resistance to fracturing. It is possible to add substances, for example mineral salts, to the PMMA for example for the purpose of colouring.

In a further embodiment of the cover panel according to the invention, the at least one window region is shaped and arranged in such a way that at least one display instrument which is arranged behind the cover panel in the viewing direction is readable through this window region. The cover panel which is embodied in this way can advantageously be used to cover a plurality of display instruments which are combined in a so-called combination instrument. Typically, such combination instruments have relatively large surface regions in which display instruments cannot be located. By providing the regions of the cover panel which correspond to such surface regions at least partially with microstructuring it is possible to reduce disruptive reflections and/or ghost images without adversely affecting the readability of the display instruments. It is possible in this context that a window region without microstructuring is arranged in such a way that a display instrument is located in a completely readable fashion behind this window region in the viewing direction. However, it is also possible to arrange a window region in such a way that a plurality of display instruments of a combination instruments which are arranged behind the latter can be read.

In a further embodiment of the cover panel according to the invention, at least one window region is shaped and arranged essentially in a precisely fitting fashion with respect to a display instrument which is readable through this window region. A cover panel which is embodied in this way can advantageously be used to configure an external design in a combination instrument which is perceived as being of high quality. For example, mounting gaps and/or fitting tolerances when individual display instruments are inserted into a combination instrument can be concealed or made less easily visible.

A method according to the invention for manufacturing a cover panel comprises the steps manufacturing or adapting at least one moulding tool for moulding a cover panel, wherein a microstructure matrix for forming a microstructure on a part of the moulding tool which is assigned to a surface of a moulded cover panel, wherein parts of the moulding tool which are assigned to window regions are cut out from the microstructure matrix, and moulding at least one cover panel by means of the moulding tool with the microstructure matrix applied.

By applying the microstructure matrix to a part of the moulding tool it is possible to provide a cover panel to be fabricated with a microstructured surface on the desired regions during the moulding process, which microstructured surface brings about the desired reduction in reflections on this surface. Therefore, additional fabrication steps which are necessary according to the prior art, for applying such a microstructure to an already moulded cover panel, are avoided. Therefore, the method according to the invention permits a more cost-effective, simpler and faster manufacture of cover panels with a surface with at least partially reduced reflection.

In one embodiment of the method according to the invention for manufacturing a cover panel, the moulding of the cover panel takes place by means of injection moulding. Injection moulding is suitable as a fabrication method for the cost-effective fabrication of components from thermoplastics or thermosetting plastics inter alia, for plastics with the desired glass-like optical properties. Injection moulding is also suitable for manufacturing relatively large amounts and therefore complements the advantage arising from the elimination of further processing steps for applying a microstructure to an already moulded cover panel. However, other moulding methods such as compression moulding or injection moulding are also possible for moulding a cover panel with simultaneous at least partial application of a microstructure.

In one embodiment of the method according to the invention for manufacturing a cover panel, the moulding tool is fabricated from steel and the microstructure matrix is applied by means of etching. Steel can be processed precisely and cost-effectively with known fabrication methods to manufacture moulding tools and has a high temperature-resistance and mechanical strength. Therefore, steel is suited, for example, very well to the fabrication of moulding tools for injection moulding thermoplastics. In addition, a microstructure matrix can be formed very easily and cost-effectively on steel surfaces by means of etching methods. The complementary mould or negative mould of such a microstructure matrix form or negative form of such a microstructure matrix is mapped as a microstructure onto the surface of a component which is shaped from steel with a moulding tool which has been etched in this way. As a result, injection moulded parts, for example from PMMA, can very easily be manufactured with at least partially microstructured surface.

In addition it is possible to limit the etching process to certain regions of a moulding tool made of steel or to exclude certain regions of a steel surface on such a moulding tool from the etching. For example, an etching base or cover surface coating can be applied to part of the surface which is not attacked by the etching substance. Partial surfaces of a surface which are covered with this etching base on such a moulding tool are therefore not etched and remain with the original surface quality, that is to say without an acquired microstructure matrix. After the etching, the etching base is removed, for example chemically, with a solvent, or mechanically by erosion or abrasion.

A person skilled in the art is also familiar with light-sensitive etching base materials. Here, a covering made of an etching base is firstly applied to a moulding surface of a moulding tool. By structured exposure, for example in a manner of a projector or by means of an applied exposure mask which is opaque in certain areas, the etching base covering is selectively subjected to exposure with a desired geometry. In the exposed regions, the chemical composition of the etching base covering changes. As a result, the etching base covering can be selectively eroded, for example by means of chemical methods, in such a way that only etching base remains on the regions of the moulding surface which were either all subjected to exposure or which were all excluded from the exposure. By means of such photochemical methods, even complex geometries can be selected on the moulding surface of a moulding tool in a very precisely and satisfactorily reproducible fashion, which moulding surface produces a microstructured surface on a cover panel which is shaped therewith.

In one embodiment of the method according to the invention for manufacturing a cover panel, a microstructure carrier which at least partially supports the microstructure matrix is arranged in an exchangeable fashion in the moulding tool. By exchanging the microstructure carrier, cover panels are therefore manufacturable with different arrangement of window regions with the same geometric basic shape.

For example, it is possible to arrange detachably an exchangeable microstructure carrier in the manner of a steel plate on an essentially planar surface of an injection moulding die, in a way which corresponds to a surface of a cover panel which is shaped therewith. Such an exchangeable microstructure carrier can be etched selectively, for example by means of a photochemical etching method. As a result, such an exchangeable microstructure carrier can mould a microstructured surface with window regions on a cover panel, wherein the shape and arrangement of the window regions are determined by the application and/or the exposure of an etching base on the exchangeable microstructure carrier. Etched surface regions of the microstructure carrier therefore act as a microstructure matrix and mould microstructured surface regions on a cover panel, while non-etched surface regions of the microstructure carrier mould window regions without a microstructure on a cover panel.

By replacing an exchangeable microstructure carrier with another exchangeable microstructure carrier in which, for example, other surface regions have been etched, for example by a different application and/or by different exposure of an etching base, it is therefore possible, for example, to mould cover panels of the same geometric shape but with a different arrangement of window regions on a microstructured surface using the same moulding tool.

For example it is possible to use a moulding tool to manufacture cover panels for combination instruments which, although they are geometrically shaped in the same way, comprise different display instruments. For example, in the case of a shape of a combination instrument which comprises a speedometer and an R.P.M. counter, two window regions corresponding to the speedometer and to the R.P.M. counter are arranged. In another design of such a combination instrument which comprises a speedometer but no R.P.M. counter, a window region corresponding to the speedometer is arranged and the rest of the cover panel is provided with a microstructured surface.

Costs for moulding tools are therefore advantageously reduced. In addition, the sequence when fabricating cover panels is simplified.

Exemplary embodiments of the invention are explained in more detail on the basis of the appended schematic figures, in which.

Figure 1:
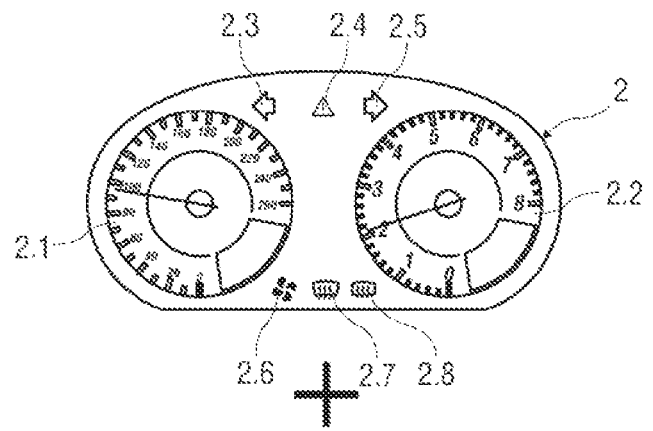
FIG. 1 is a schematic view of a combination instrument and a cover panel.
Figure 1:
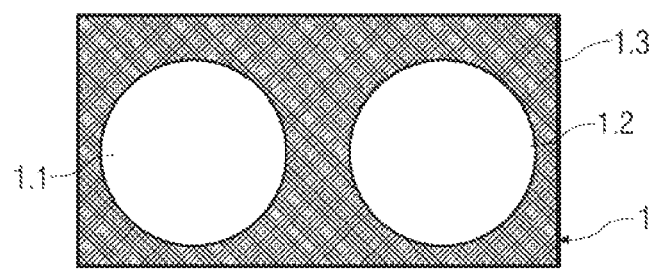
Figure 1:
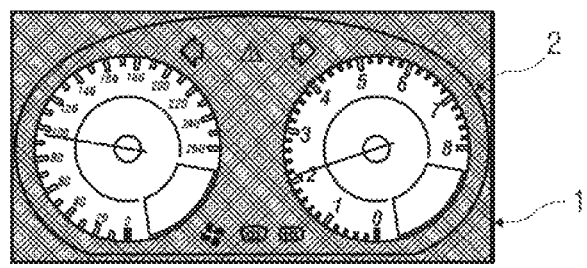

FIG. 1 shows a schematic view of a cover panel 1 which is moulded essentially from PMMA and has a rectangular basic shape. The cover panel 1 is provided for installation in front of a combination instrument 2 in the reading direction. The combination instrument 2 comprises display instruments 2.1 to 2.8. In this context, the display instruments 2.1 and 2.2 are embodied for example as tubular analogue pointer instruments which comprise a rotatable pointer with a centrally arranged pointer axis and an essentially circular scale division. For example, the display instrument 2.1 is embodied as a speed display instrument and the display instrument 2.2 as a rotational speed display instrument. Further display instruments 2.3 to 2.8 are embodied as monitoring lights or warning lights, for example as flashing monitoring lights 2.3 to 2.5, as a monitoring light 2.6 for activation of a fan or as monitoring lights 2.7, 2.8 for a switched-on windscreen heater.

On the surface of the cover panel 1 facing an observer, the reflection-reducing microstructure 1.3 is applied, from which microstructure 1.3 two essentially circular window regions 1.1, 1.2 are cut out. The window regions 1.1, 1.2 are arranged in such a way that when the cover panel 1 is arranged in front of the combination instrument 2 in the reading direction, the speed display instrument 2.1 is readable through the window region 1.1, and the rotational speed display instrument 2.2 is readable through the window region 1.2.

Disruptive direct reflections at the optical boundary face between the air and PMMA on the surface of the cover panel 1 facing the observer are reduced by the microstructure 1.3 which is applied in a planar fashion. The window regions 1.1, 1.2 which are cut out from the microstructure 1.3 improve the contrast and/or the brightness and/or the sharpness of the imaging of the analogue display instruments 2.1, 2.2 arranged behind these window regions 1.1, 1.2. As a result, ergonomic and precise readability, for example of speed values of the speed display instrument 2.1 or of rotational speed values of the rotational speed display instrument 2.2 is advantageously made possible. The quantitatively accurate reading of specific values is particularly significant for such analogue pointer instruments 2.1, 2.2. The other display instruments 2.3 to 2.8 which are embodied as monitoring lights or warning lights can, on the other hand, also be sufficiently well perceived behind regions of the cover panel 1 which are matted by means of applied microstructure 1.3.

Figure 2:
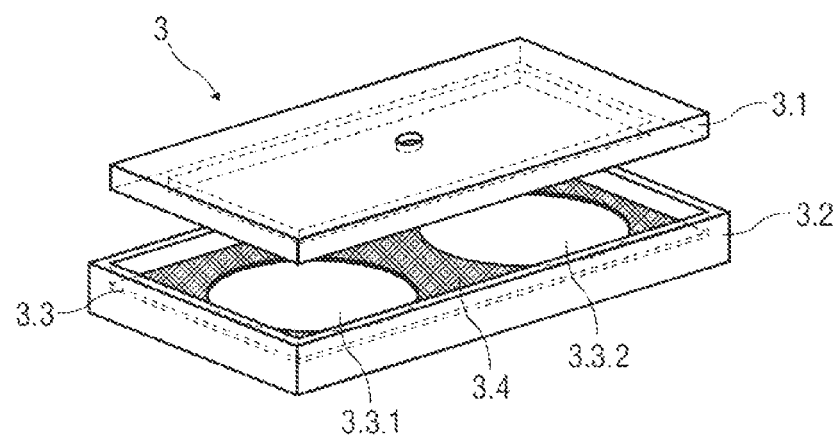
FIG. 2 is a schematic view of a moulding tool for a cover panel.

FIG. 2 shows a schematic view of a moulding tool 3 for moulding a cover panel 1 with a rectangular basic shape. The moulding tool 3 is divided into an upper die 3.1 and into a lower die 3.2. On the lower die 3.2, a microstructure carrier 3.3 is arranged. The surface of the microstructure carrier 3.3 which points to the upper die 3.1 has a microstructure matrix 3.4 with an essentially rectangular outline and two circular cut outs 3.3.1, 3.3.2 which correspond to the window regions 1.1, 1.2.

It is possible that the microstructure carrier 3.3 is detachably connected to the lower die 3.2 and can be exchanged. This makes it possible to use the same moulding tool 3 to fabricate cover panels 1 of the same rectangular basic shape but with a different number and/or shape and/or arrangement of window regions 1.1, 1.2. This advantageously permits more cost-effective and flexible manufacture of cover panels 1.

LIST OF REFERENCE NUMBERS

1 Cover panel
1.1, 1.2 Window region
1.3 Microstructure
2 Combination instrument
2.1 to 2.8 Display instrument
3 Moulding tool
3.1 Upper die
3.2 Lower die
3.3 Microstructure carrier
3.3.1, 3.3.2 Cutout
3.4 Microstructure matrix

The invention claimed is:

1. A system, comprising:
a combination instrument in a vehicle, the combination instrument comprising at least one first display instrument and at least one second display instrument; and
a cover panel at least partially transparently covering the combination instrument, comprising:
at least one surface of the cover panel;
a microstructure formed into parts of the at least one surface of the cover panel, wherein the microstructure is configured to scatter visible light which is incident on the cover panel, the combination instrument arranged such that the at least one first display instrument is arranged behind the parts; and
at least one window region of the cover panel, wherein the microstructure is not formed into the at least one surface, wherein the at least one second display instrument is arranged behind the at least one window region and is readable through the at least one window region;
wherein the at least one first display instrument comprises at least one of a monitoring light or a warning light and wherein at least one second display instrument comprises an analogue pointer instrument; and
wherein the cover panel is essentially composed of thermoplastic or thermosetting plastic.

2. The system according to claim 1, wherein the at least one window region is shaped and arranged essentially in a precisely fitting fashion with respect to the combination instrument.

3. The system of claim 1, wherein thermoplastic or thermosetting plastic is polymethylmethacrylate.

4. The system of claim 3, wherein the polymethylmethacrylate further comprises mineral salts added for coloring.

* * * * *